US012670797B2

(12) United States Patent (10) Patent No.: US 12,670,797 B2
Han (45) Date of Patent: Jun. 30, 2026

(54) SYSTEM AND METHOD FOR CONTROLLING FLIGHT

(71) Applicants: Hyundai Motor Company, Seoul (KR); Kia Corporation, Seoul (KR)

(72) Inventor: Su Young Han, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 214 days.

(21) Appl. No.: 17/947,853

(22) Filed: Sep. 19, 2022

(65) Prior Publication Data

US 2023/0290253 A1 Sep. 14, 2023

(30) Foreign Application Priority Data

Mar. 10, 2022 (KR) ........................ 10-2022-0030194

(51) Int. Cl.
*G08G 5/26* (2025.01)
*G05D 1/00* (2024.01)
(52) U.S. Cl.
CPC .............. *G08G 5/26* (2025.01); *G05D 1/101* (2013.01)
(58) Field of Classification Search
CPC .............................. G05D 1/101; G08G 5/0013
See application file for complete search history.

(56) References Cited

U.S. PATENT DOCUMENTS

| 10,389,432 B2 | 8/2019 | De Rosa et al. | |
| 2009/0248287 A1 | 10/2009 | Limbaugh et al. | |
| 2013/0329364 A1* | 12/2013 | Kameno ............ | H05K 7/20154 |
| | | | 361/695 |
| 2017/0126309 A1 | 5/2017 | Rupasinghe et al. | |
| 2017/0129603 A1* | 5/2017 | Raptopoulos ............. | B64F 1/22 |
| 2017/0357273 A1 | 12/2017 | Michini et al. | |
| 2018/0233054 A1* | 8/2018 | Woon ........................ | G08G 5/74 |
| 2018/0375568 A1 | 12/2018 | De Rosa et al. | |
| 2019/0379445 A1 | 12/2019 | De Rosa et al. | |
| 2020/0365038 A1 | 11/2020 | Eaves et al. | |
| 2022/0045747 A1 | 2/2022 | De Rosa et al. | |

FOREIGN PATENT DOCUMENTS

| CN | 109992005 A | 7/2019 |
| JP | 2003-0127994 A | 5/2003 |
| KR | 10-2021-0069549 A | 6/2021 |
| WO | 2018-0171976 A1 | 9/2018 |

* cited by examiner

*Primary Examiner* — Aaron L Troost
(74) *Attorney, Agent, or Firm* — Fox Rothschild LLP

(57) ABSTRACT

A system for controlling flight includes an aerial vehicle, which flies in at least one control area, a plurality of ground internetworking devices provided in the at least one control area to perform communication with the aerial vehicle, and a ground control station to perform communication with at least one of the ground internetworking devices depending on a position of the aerial vehicle.

13 Claims, 8 Drawing Sheets

130

SYSTEM AND METHOD FOR
CONTROLLING FLIGHT

CROSS-REFERENCE TO RELATED
APPLICATION

This application claims under 35 U.S.C. § 119(a) the benefit of priority to Korean Patent Application No. 10-2022-0030194, filed in the Korean Intellectual Property Office on Mar. 10, 2022, the entire contents of which is incorporated herein by reference.

TECHNICAL FIELD

The present disclosure relates to a system and a method for controlling flight.

BACKGROUND

An unmanned aerial vehicle includes an aerial vehicle controlled by a ground control station, instead of controlled by a person, as the person may be personally boarded on the aerial vehicle.

In general, the flight of the unmanned aerial vehicle may be controlled through satellite communication. However, the flight of the unmanned aerial vehicle may not be easily controlled under the environment not allowing satellite communication, because information for controlling the flight may not be transmitted from the ground control station to the aerial vehicle.

SUMMARY

The present disclosure has been made to solve the above-mentioned problems occurring in the existing technologies while advantages achieved by the existing technologies may be maintained intact.

An exemplary embodiment of the present disclosure provides a system and a method for controlling flight, even under the environment not allowing satellite communication.

The technical problems to be solved by the present disclosure may not be limited to the aforementioned problems, and any other technical problems not mentioned herein will be clearly understood from the following description by those skilled in the art to which the present disclosure pertains.

According to an exemplary embodiment of the present disclosure, a system for controlling flight may include an aerial vehicle that is configured to fly in at least one control area, a plurality of ground internetworking devices provided in the at least one control area to perform communication with the aerial vehicle, and a ground control station configured to perform communication with at least one of the ground internetworking devices depending on a position of the aerial vehicle.

The ground control station may perform communication with an n-th ground internetworking device, of the plurality of ground internetworking devices that may be provided in an n-th control area when the aerial vehicle is in the n-th control area of the at least one control area.

The ground control station may perform communication with the n-th ground internetworking device of the plurality of ground internetworking devices that may be provided the n-th control area, of the plurality of ground internetworking devices and may perform communication with the (n+1)-th ground internetworking device that may be provided the (n+1)-th control area, when the aerial vehicle is in a hand-over area between the n-th control area of the at least one control area and the (n+1)-th control area adjacent to the n-th control area.

The ground control station may be configured to perform commercial network communication with the ground inter-networking device.

The ground control station may be configured to transmit information for controlling the aerial vehicle to the ground internetworking device.

The ground internetworking device(s) may be configured to perform line of sight (LOS) communication with the aerial vehicle.

The ground internetworking device(s) may be configured to convert the information for controlling the aerial vehicle that may be received from the ground control station transmitted through the LOS communication to create a converted information for controlling the aerial vehicle.

The ground internetworking device(s) may transmit, to the aerial vehicle, the converted information for controlling the aerial vehicle.

The control area may include an area allowing LOS communication with the ground internetworking device.

The system may further include a control device configured to perform commercial network communication with the ground control station.

According to another exemplary embodiment of the present disclosure, a method for controlling flight may include determining, by a ground control station, a control area in which an aerial vehicle flies, and performing, by the ground control station, communication with at least one ground internetworking device depending on the control area in which the aerial vehicle flies.

The performing, by the ground control station, communication with the at least one ground internetworking device may include performing communication with an n-th ground internetworking device of the at least one ground internetworking device that may be provided in an n-th control area of at least one control area when the aerial vehicle may be in the n-th control area of the at least one control area.

The performing, by the ground control station, communication with the at least one ground internetworking device may include performing communication with an n-th ground internetworking device that may be provided in an n-th control area of at least one control area, and an (n+1)-th ground internetworking device, which may be provided in an (n+1)-th control area adjacent to the n-th control area, when the aerial vehicle may be in an hand-over area between the n-th control area and the (n+1)-th control area.

The performing, by the ground control station, communication with the at least one ground internetworking device may include performing commercial network communication.

The performing, by the ground control station, communication with the at least one ground internetworking device may include transmitting information for controlling the aerial vehicle to the at least one ground internetworking device.

The method may further include converting the information for controlling the aerial vehicle that may be received from the ground control station transmitted through the LOS communication, after performing, by the ground control station, communication with the at least one ground inter-networking device.

The method may further include performing communication between the at least one ground internetworking device and the aerial vehicle, after performing, by the ground control station, communication with the at least one ground internetworking device.

The performing of the communication between the at least one ground internetworking device and the aerial vehicle may include performing the LOS communication.

The performing of the communication between the at least one ground internetworking device and the aerial vehicle may include transmitting the information for controlling the aerial vehicle transmitted through the LOS communication.

The control area may include an area allowing LOS communication with the ground internetworking device.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
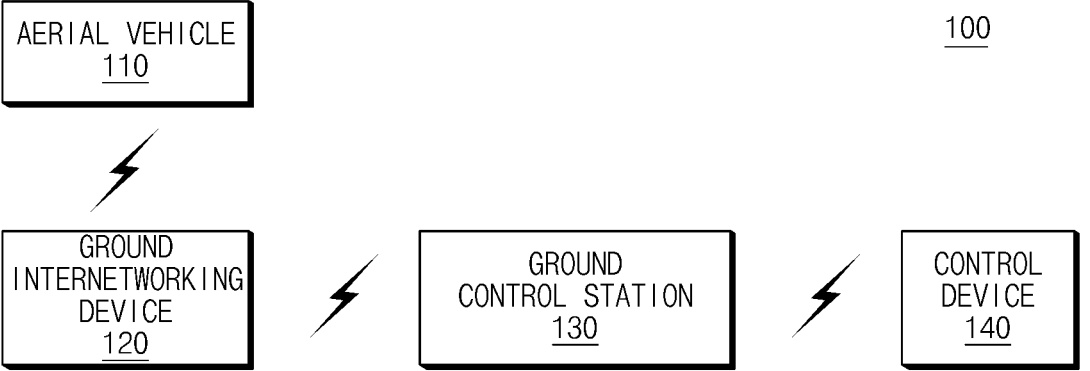
FIG. 1 is a view illustrating the configuration of a system for controlling flight, according to an embodiment of the present disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, rom, ram, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a controller area network (CAN).

Unless specifically stated or obvious from context, as used herein, the term "about" is understood as within a range of normal tolerance in the art, for example within 2 standard deviations of the mean. "about" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, some embodiments of the present disclosure will be described in detail with reference to the accompanying drawings. In adding the reference numerals to the components of each drawing, it should be noted that the identical or equivalent component may be designated by the identical numeral even when they may be displayed on other drawings. Further, in describing the embodiment of the present disclosure, a detailed description of well-known features or functions will be ruled out in order not to unnecessarily obscure the gist of the present disclosure.

In addition, in the following description of components according to an embodiment of the present disclosure, the terms 'first', 'second', 'A', 'B', '(a)', and '(b)' may be used. These terms may be merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary may be to be interpreted as having meanings equal to the contextual meanings in the relevant field of art, and may not be to be interpreted as having ideal or excessively formal meanings unless clearly defined as having such in the present application.

FIG. 1 is a view illustrating the configuration of a system for controlling flight, according to an embodiment of the present disclosure.

As illustrated in FIG. 1, a system 100 (or a flight control system) for controlling flight may include an aerial vehicle 110, a ground internetworking device 120, an ground control station 130, and a control device 140.

The aerial vehicle 110 may include an unmanned aerial vehicle and a manned vehicle. The unmanned aerial vehicle may be controlled in flight, based on information for controlling the aerial vehicle that may be received from the ground control station 130. The aerial vehicle 110 may include a data link, and may transmit or receive information together with the ground internetworking device 120 through the data link, under the control of the ground control station 130. According to an embodiment, the aerial vehicle 110 may transmit flight information to the ground internetworking device 120 through the data link.

The ground internetworking device 120 may be provided in each control area, and may perform communication with the aerial vehicle 110. According to an embodiment, the ground internetworking device 120 may include an n-th ground internetworking device $120_n$ provided in an n-th control area ('n' may be a natural number of '1' or more), and an (n+1)-th ground internetworking device $120_{n+1}$ provided in the (n+1)-th control area. The ground internetworking device 120 may be preferably provided at a position for securing line of sight (LOS) and for minimizing a communication link range. Accordingly, as the mechanical specifications of the data link installed in the aerial vehicle 110 may be minimized, a low-heat-emitting, low-power-consumption, and low-weight aerial vehicle may be realized. According to an embodiment of the present disclosure, the ground internetworking device 120 may be provided at the top of a building or at the top of a mountain. The ground internetworking device 120 may be configured to convert information received from the ground control station 130 and may transmit the converted information to the aerial vehicle 110. Hereinafter, the details of the ground internetworking device 120 will be described with reference to FIG. 2.

The ground control station 130 may be configured to perform communication with at least one ground internetworking device 120, depending on the position of the aerial vehicle 110. The ground control station 130 may have a ground pilot for controlling the aerial vehicle 110 or a controller. In addition, the ground control station 130 may be configured to transmit information for controlling the aerial vehicle 110 to the aerial vehicle 110. When the additional controller of the ground control station 130 may not be provided, the operation of the controller may be substituted for the control by the ground pilot and may be executed. Hereinafter, the details of the ground control station 130 will be described with reference to FIG. 3.

The control device 140 may include air traffic control (ATC) to control the air traffic. The control device 140 may be configured to perform communication with the ground control station 130, may be configured to monitor the flight of the aerial vehicle 110, and may be configured to transmit information for safe flight to the ground control station 130.

Figure 2:
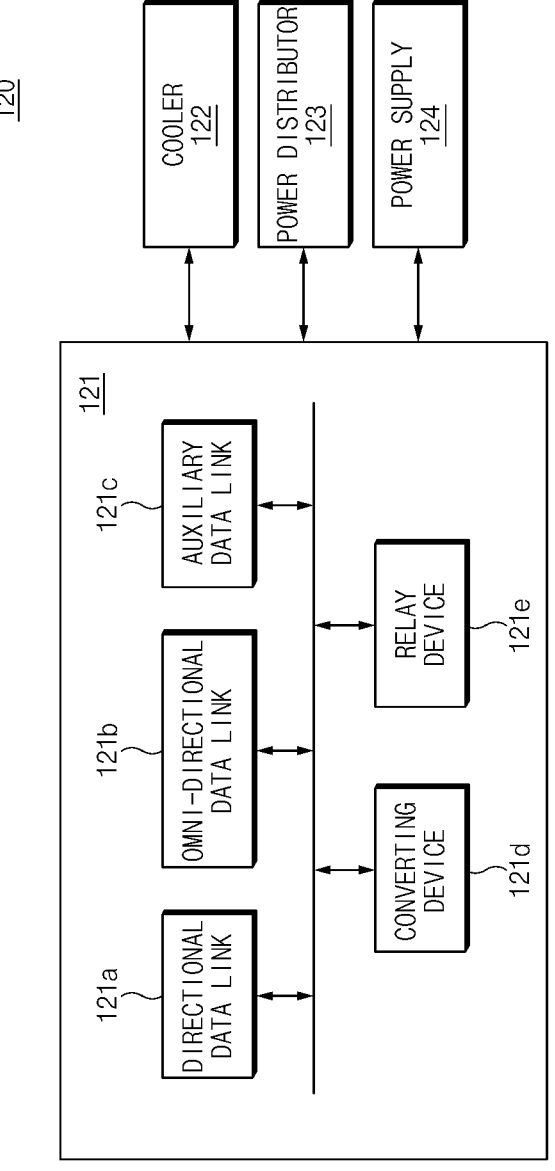
FIG. 2 is a view illustrating the configuration of a ground internetworking device, according to an embodiment of the present disclosure.

FIG. 2 is a view illustrating the configuration of a ground internetworking device, according to an embodiment of the present disclosure.

The ground internetworking device 120 may include a communication device 121, a cooler 122, a power distributor 123, and a power supply 124. The ground internetworking device 120 may be provided in each of the n-th control area and the (n+1)—the control area which may be overlapped with each other. In this case, the control area may include an area allowing LOS communication with the ground internetworking device 120.

The communication device 121 may include a directional data link 121a, an omni-directional data link 121b, an auxiliary data link 121c, a converting device 121d, and a relay device 121e.

The directional data link 121a may be configured to communicate with the aerial vehicle 110 positioned at longer distance. According to an embodiment, the directional data link 121a may receive flight information including the position of the aerial vehicle 110 from the aerial vehicle 110, and may be configured to transmit the information for controlling the aerial vehicle 110 which may be received from the ground control station 130 and converted.

The omni-directional data link 121b may be configured to communicate with a plurality of aerial vehicle 110. According to an embodiment, the omni-directional data link 121b may receive flight information including the position of the aerial vehicle 110 from the aerial vehicle 110, and may transmit the information for controlling the aerial vehicle 110 that may be received from the ground control station 130 and converted.

The auxiliary data link 121c may operate as a link to continuously perform communication with the aerial vehicle 110, when the failure of the directional data link 121a and the omni-directive data link 121b may be caused or the error of the interface may be caused.

The converting device 121d may convert information for controlling the aerial vehicle 110 that may be received from the ground control station 130 transmitted through the LOS communication, or may covert the flight information received from the aerial vehicle 110 transmitted through the commercial network communication.

The relay device 121e may be configured to perform commercial network communication with the ground control station 130. In this case, the commercial network communication may include communication that may be currently used, for example, Long-Term Evolution (LTE) communication or 5G communication.

The cooler 122 may be provided to reduce the retention of heat emitted from the data links 121a, 121b, and 121c.

The power distributor 123 may distribute power required for the communication device 121 and the cooler 122.

The power supply 124 may include an uninterruptible power supply (UPS) to continuously supply power, when main power (commercial power) supplied to the ground internetworking device 120 may be disconnected.

Figure 3:
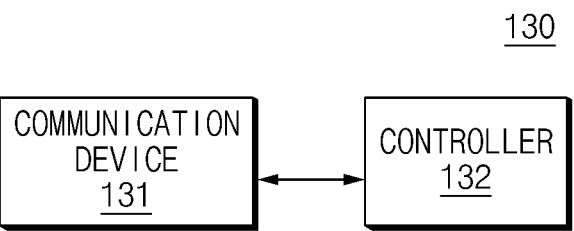
FIG. 3 is a view illustrating the configuration of a ground control station, according to an embodiment of the present disclosure.

FIG. 3 is a view illustrating the configuration of a ground control station, according to an embodiment of the present disclosure.

The ground control station 130 may include a communication device 131 and a controller 132.

The communication device 131 may be configured to communicate with the ground internetworking device 120, over the commercial network. For example, the commercial network communication may include LTE communication or 5G communication. The communication device 131 may be configured to transmit the information for controlling the aerial vehicle 110 to the ground internetworking device 120, and may be configured to receive the flight information received from the aerial vehicle 110 from the ground internetworking device 120.

The controller 132 may be implemented by various processing devices, such as a microprocessor embedded therein with a semiconductor chip to operate or execute various instructions, and may control the overall operation of the flight control system, according to an embodiment of the present disclosure. Hereinafter, the details thereof will be made with reference to FIG. 4 to FIG. 6.

Figure 4:
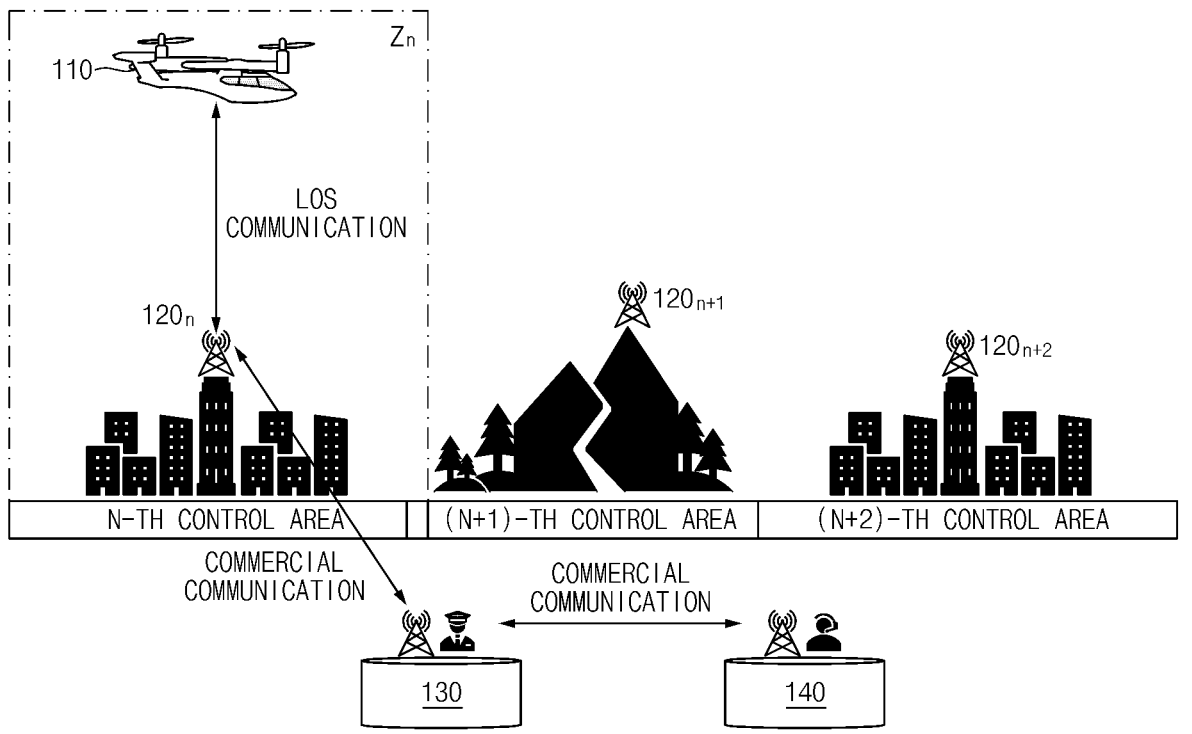
FIGS. 4 to 6 are views schematically illustrating the operation for flight control, according to an embodiment of the present disclosure.
Figure 5:
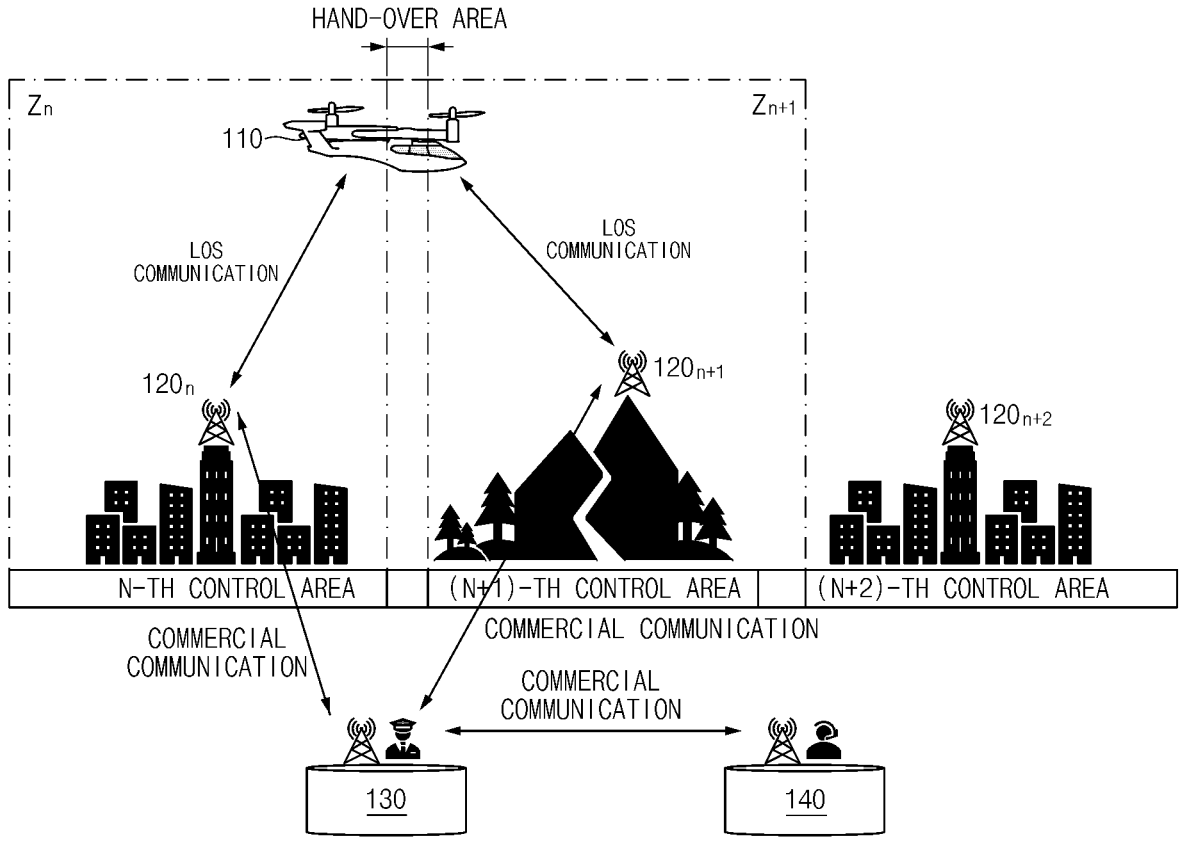
Figure 6:
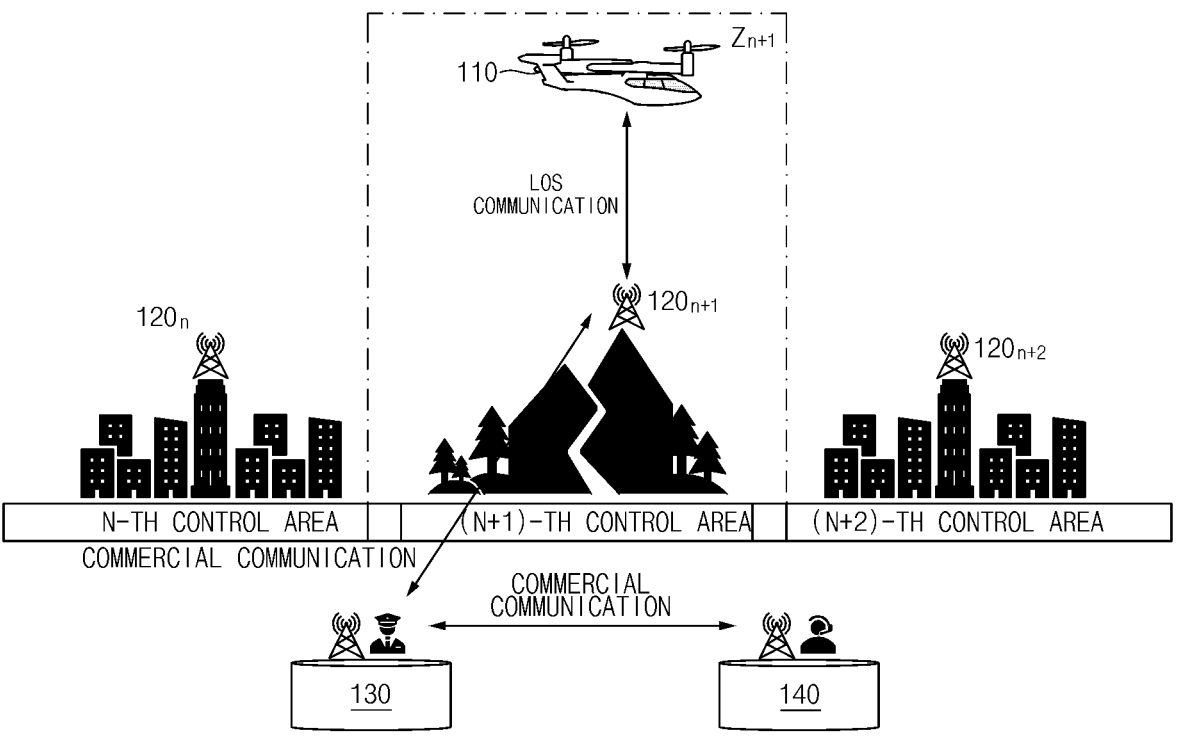

FIGS. 4 to 6 are views schematically illustrating the operation for flight control, according to an embodiment of the present disclosure.

The controller 132 may determine the position of the aerial vehicle 110. The controller 132 may determine whether the position of the aerial vehicle 110 may be in the n-th control area $Z_n$.

As illustrated in FIG. 4, when determining the aerial vehicle 110 as being positioned in the n-th control area $Z_n$, the controller 132 may perform communicate with the n-th ground internetworking device $120_n$ provided in the n-th control area. According to an embodiment, the controller 132 may perform communication with the n-th ground internetworking device $120_n$ over a commercial network.

The controller 132 may transmit the information for controlling the aerial vehicle 110, which may be required for the flight, to the n-th ground internetworking device $120_n$. According to an embodiment, the controller 132 may transmit information received from the control device 140. For example, the controller 132 may transmit weather information required for flight, a position of another aerial vehicle, and information on an emergency situation, to the n-th ground internetworking device $120_n$.

In addition, the controller 132 may transmit information for controlling the aerial vehicle 110, based on the information received from the control device 140. According to an embodiment, the controller 132 may transmit a position, an altitude, or a speed for the flight.

As illustrated in FIG. 5, the controller 132 may perform communication with the n-th ground internetworking device $120n$ provided in the n-th control area $Z_n$, and the (n+1)-th ground internetworking device $120_{n+1}$ provided in the (n+1)-th control area $Z_{n+1}$, when determining the position of the aerial vehicle 110 as being in a hand-over area between the n-th control area $Z_n$, in which the aerial vehicle 110 may be positioned, and the (n+1)-th control area $Z_{n+1}$ adjacent to the n-th control area $Z_n$, as the aerial vehicle 110 moves. According to an embodiment, the controller 132 may perform communication with the n-th ground internetworking device $120_n$ and the (n+1)-th ground internetworking device $120_{n+1}$ over the commercial network.

The controller 132 may transmit the information for controlling the aerial vehicle 110, which may be required for the flight, to the n-th ground internetworking device $120_n$ and the (n+1)-th ground internetworking device $120_{n+1}$. According to an embodiment, the controller 132 may transmit information received from the control device 140. For example, the controller 132 may transmit weather information required for flight, a position of another aerial vehicle, and information on an emergency situation, the n-th ground internetworking device $120n$ and the (n+1)-th ground internetworking device $120_{n+1}$.

In addition, the controller 132 may transmit information for controlling the aerial vehicle 110, based on the information received from the control device 140. According to an embodiment, the controller 132 may transmit a position, an altitude, or a speed for the flight.

As illustrated in FIG. 6, the controller 132 may perform communication with the (n+1)-th ground internetworking device $120_n$ provided in the (n+1)-th control area $Z_n$, and the (n+1)-th ground internetworking device $120_{n+1}$ provided in the (n+1)-th control area $Z_{n+1}$, when determining the position of the aerial vehicle 110 as being in the (n+1)-th control area $Z_{n+1}$, as the aerial vehicle 110 moves. According to an embodiment, the controller 132 may perform communication with the (n+1)-th ground internetworking device $120_{n+1}$ over a commercial network.

The controller 132 may transmit the information for controlling the aerial vehicle 110, which may be required for the flight, to the (n+1)-th ground internetworking device $120_{n+1}$. According to an embodiment, the controller 132 may transmit information received from the control device 140. For example, the controller 132 may transmit weather information required for flight, a position of another aerial vehicle, and information on an emergency situation, to the (n+1)-th ground internetworking device $120_{n+1}$.

In addition, the controller 132 may transmit information for controlling the aerial vehicle 110, based on the information received from the control device 140. According to an embodiment, the controller 132 may transmit a position, an altitude, or a speed for the flight.

In the above-described manner, the controller 132 may select the ground internetworking device 120 for communication depending on the position of the aerial vehicle 110 and may transmit or receive information, when the position of the aerial vehicle 110 may be changed, as the aerial vehicle 110 moves, thereby continuously performing communication with the aerial vehicle 110 even if the satellite communication may be failed.

Figure 7:
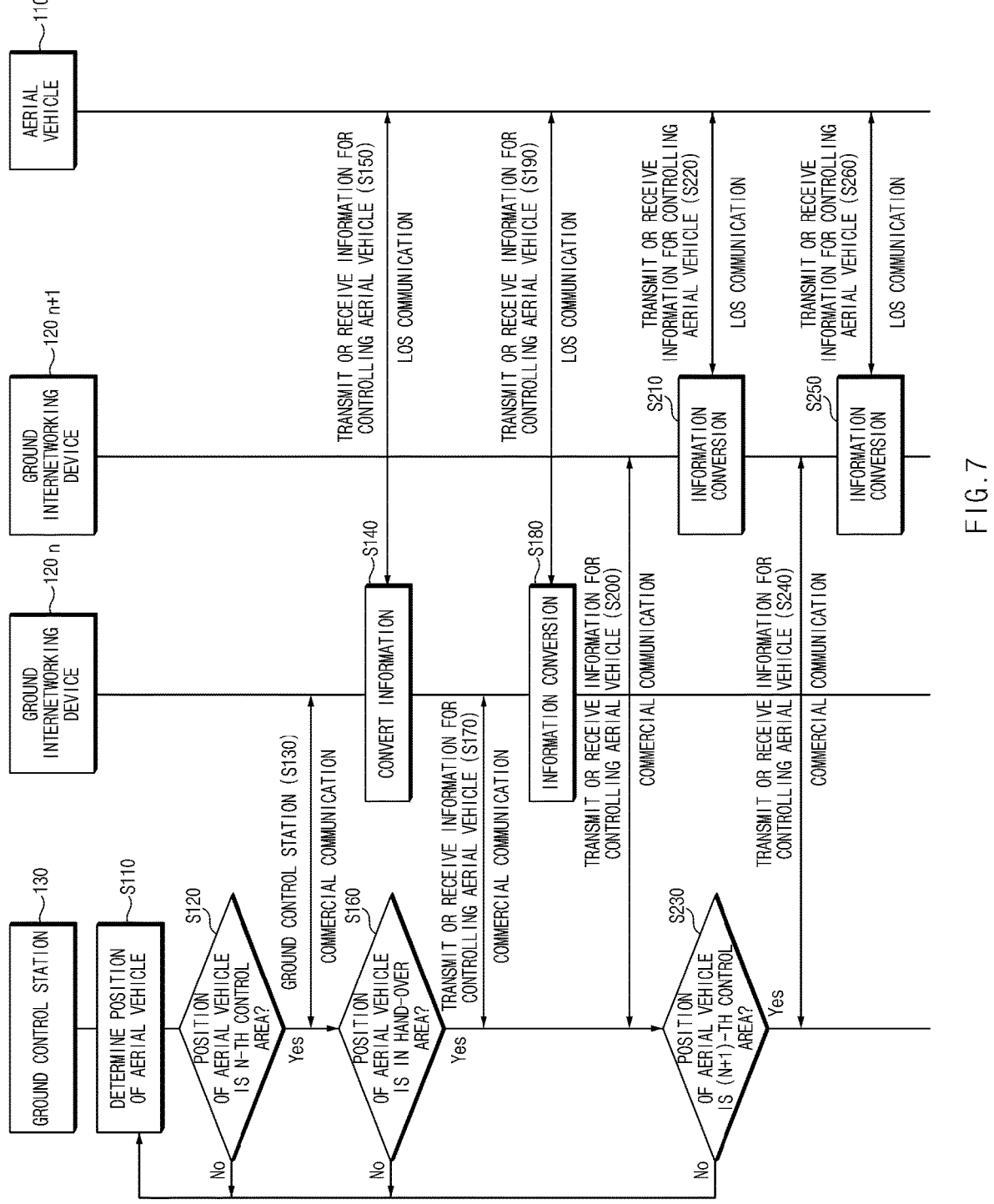
FIG. 7 is a view illustrating a method for controlling flight, according to an embodiment of the present disclosure.

FIG. 7 is a view illustrating a method for controlling flight, according to an embodiment of the present disclosure.

As illustrated in FIG. 7, the ground control station 130 may determine the position of the aerial vehicle 110 (S110). The controller 130 may determine whether the position of the aerial vehicle 110 is in the n-th control area $Z_n$ (S120).

In S120, when determining the aerial vehicle 110 as being positioned in the n-th control area $Z_n$, the controller 130 may perform communicate with the n-th ground internetworking device $120_n$ provided in the n-th control area (S130). According to an embodiment, in S130, the ground control station 130 may transmit or receive the information for controlling the aerial vehicle 110, which is required for the flight, through the commercial network communication together with the n-th ground internetworking device $120_n$. According to an embodiment, the information for controlling the aerial vehicle 110 may include weather information, a position of another aerial vehicle, information on an emergency situation, and a position, an altitude, and a speed for flight.

The n-th ground internetworking device $120_n$ may convert information for controlling the aerial vehicle 110 to be transmitted through the LOS communication, when receiving the information for controlling the aerial vehicle 110 from the ground control station 130 (S140). The n-th ground internetworking device $120_n$ may transmit the converted information to the aerial vehicle 110 through the LOS communication (S150).

The ground control station 130 may determine whether the position of the aerial vehicle 110 is in a hand-over area between the n-th control area $Z_n$, in which the aerial vehicle 110 is positioned, and the (n+1)-th control area $Z_{n+1}$ adjacent to the n-th control area $Z_n$, as the aerial vehicle 110 moves (S160).

The ground control station 130 may perform communication with the n-th ground internetworking device $120_n$ provided in the n-th control area $Z_n$ (S170), and may perform communication with the (n+1)-th ground internetworking device $120_{n+1}$ provided in the (n+1)-th control area $Z_{n+1}$ (S200), when determining the position of the aerial vehicle 110 as being in the hand-over area.

According to an embodiment, in S170, the ground control station 130 may transmit or receive the information for controlling the aerial vehicle 110, which is required for the flight, through the commercial network communication with the n-th ground internetworking device $120_n$. In addition, in S220, the ground control station 130 may transmit or receive the information for controlling the aerial vehicle 110, which is required for the flight, through the commercial network communication with the (n+1)-th ground internetworking device $120_{n+1}$.

The n-th ground internetworking device $120_n$ may convert information for controlling the aerial vehicle 110, which is to be transmitted through the LOS communication, when receiving the information for the aerial vehicle 110 from the ground control station 130 (S180). The n-th ground internetworking device $120_n$ may transmit the converted information to the aerial vehicle 110 through the LOS communication, and may receive flight information from the aerial vehicle 110 (S190).

The (n+1)-th ground internetworking device $120_{n+1}$ may convert information for controlling the aerial vehicle 110 to be transmitted through the LOS communication (S210), when receiving the information for controlling the aerial vehicle 110 from the ground control station 130 (S200). The n-th ground internetworking device $120_n$ may transmit the converted information to the aerial vehicle 110 through the LOS communication, and may receive flight information from the aerial vehicle 110 (S220).

The ground control station 130 may determine whether the aerial vehicle 110 is positioned in the (n+1)-th control area $Z_{n+1}$ after passing through the hand-over area, as the aerial vehicle 110 moves (S230).

In S230, the ground control station 130 may perform communication with the (n+1)-th ground internetworking device $120_n$ provided in the (n+1)-th control area $Z_n$, when determining the position of the aerial vehicle 110 as being in the (n+1)-th control area $Z_{n+1}$ (S240).

According to an embodiment, in S240, the ground control station 130 may transmit or receive the information for controlling the aerial vehicle 110, which is required for the flight, through the commercial network communication with the (n+1)-th ground internetworking device $120_n$.

The (n+1)-th ground internetworking device $120_{n+1}$ may convert information for controlling the aerial vehicle 110, which is to be transmitted through the LOS communication, when receiving the information for controlling the aerial vehicle 110 from the ground control station 130 (S250). The (n+1)-th ground internetworking device $120_{n+1}$ may transmit the converted information to the aerial vehicle 110 through the LOS communication, and may receive flight information from the aerial vehicle 110 (S260).

In the above-described manner, the ground control station 130 may select the ground internetworking device 120 for communication depending on the position of the aerial vehicle 110 and may transmit or receive information, when the position of the aerial vehicle 110 is changed, as the aerial vehicle 110 moves, thereby continuously performing communication with the aerial vehicle 110 even if the satellite communication is failed.

Figure 8:
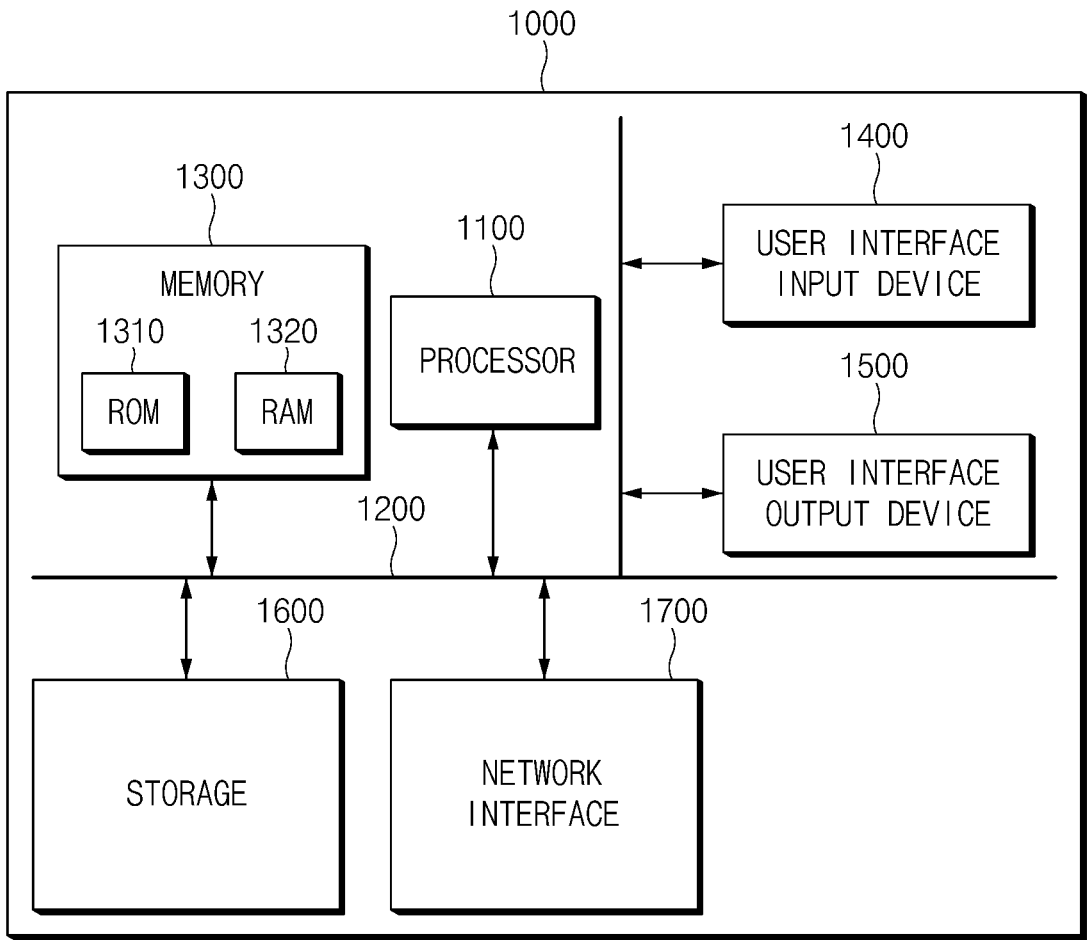
FIG. 8 is a view illustrating the configuration of a method for controlling flight, according to an embodiment of the present disclosure.

FIG. 8 is a view illustrating the configuration of the, according to an embodiment of the present disclosure.

Referring to FIG. 8, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may ay include a read only memory (ROM) and a random access memory (RAM) (see 1320).

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to an embodiment of the present disclosure, in the system and the method for controlling flight, the aerial vehicle may continuously fly, as information for controlling the flight is transmitted to the aerial vehicle through LOS communication and commercial network communication, under the environment not allowing satellite communication.

The above description is merely an example of the technical idea of the present disclosure, and various modifications and modifications may be made by one skilled in the art without departing from the essential characteristic of the disclosure.

Therefore, the exemplary embodiments of the present disclosure may be provided to explain the spirit and scope of the present disclosure, but not to limit them, so that the spirit and scope of the present disclosure may not be limited by the embodiments. The scope of protection of the present disclosure should be construed by the attached claims, and all equivalents thereof should be construed as being included within the scope of the present disclosure.

Hereinabove, although the present disclosure has been described with reference to exemplary embodiments and the accompanying drawings, the present disclosure may not be limited thereto, but may be variously modified and altered by those skilled in the art to which the present disclosure pertains without departing from the spirit and scope of the present disclosure claimed in the following claims.

What is claimed is:

1. A system for controlling flight, the system comprising:
an aerial vehicle configured to fly in at least one control area;
a plurality of ground internetworking devices provided in the at least one control area configured to communicate with the aerial vehicle; and
a ground control station configured to communicate with at least one of the plurality of ground internetworking devices depending on a position of the aerial vehicle,
wherein a ground internetworking device of the plurality of ground internetworking devices is configured to:
perform commercial network communication with the ground control station;
perform line of sight (LOS) communication with the aerial vehicle;
receive flight information from the aerial vehicle through the LOS communication; and

transmit the received flight information to the ground control station through the commercial network communication, wherein the ground internetworking device is configured to:

convert information for controlling the aerial vehicle that is received from the ground control station through the commercial network communication, so that converted information is transmitted to the aerial vehicle through the LOS communication; and convert the flight information that is received from the aerial vehicle through the LOS communication, so that the flight information is transmitted to the ground control station through the commercial network communication.

2. The system of claim 1, wherein the ground control station is configured to:

communicate with an n-th ground internetworking device of the plurality of ground internetworking devices that is provided in an n-th control area of the at least one control area when the aerial vehicle is in the n-th control area of the at least one control area.

3. The system of claim 1, wherein the ground control station is configured to:

communicate with an n-th ground internetworking device of the plurality of ground internetworking devices that is provided in an n-th control area of the at least one control area; and communicate with an (n+1)-th ground internetworking device of the plurality of ground internetworking device that is provided in an (n+1)-th control area of the at least one control area, when the aerial vehicle is in a hand-over area between the n-th control area of the at least one control area and the (n+1)-th control area adjacent to the n-th control area.

4. The system of claim 1, wherein the ground control station is configured to:

transmit information for controlling the aerial vehicle to at least one of the plurality of ground internetworking devices.

5. The system of claim 1, wherein the at least one of the plurality of ground internetworking devices is configured to transmit to the aerial vehicle the converted information for controlling the aerial vehicle.

6. The system of claim 1, wherein the at least one control area includes:

an area allowing LOS communication with at least one of the plurality of ground internetworking devices.

7. The system of claim 1, wherein the ground control station is configured to communicate with an air traffic control (ATC) device.

8. A method for controlling flight, the method comprising:

determining, by a ground control station, a control area in which an aerial vehicle flies; and performing, by the ground control station, communication with at least one ground internetworking device depending on the control area in which the aerial vehicle flies,

wherein the ground internetworking device is configured to:

perform commercial network communication with the ground control station;

perform line of sight (LOS) communication with the aerial vehicle;

receive flight information from the aerial vehicle through the LOS communication; and transmit the received flight information to the ground control station through the commercial network communication, wherein the ground internetworking device is configured to:

convert information for controlling the aerial vehicle that is received from the ground control station through the commercial network communication, so that converted information is transmitted to the aerial vehicle through the LOS communication; and convert the flight information that is received from the aerial vehicle through the LOS communication, so that the flight information is transmitted to the ground control station through the commercial network communication.

9. The method of claim 8, wherein the performing, by the ground control station, communication with the at least one ground internetworking device includes:

performing communication with an n-th ground internetworking device of the at least one ground internetworking device that is provided in an n-th control area when the aerial vehicle is in the n-th control area.

10. The method of claim 8, wherein the performing, by the ground control station, communication with the at least one ground internetworking device include:

performing communication with an n-th ground internetworking device of the at least one ground internetworking device that is provided in an n-th control area of at least one control area, and an (n+1)-th ground internetworking device of the at least one ground internetworking device that is provided in an (n+1)-th control area adjacent to the n-th control area, with the aerial vehicle in a hand-over area between the n-th control area and the (n+1)-th control area.

11. The method of claim 8, wherein the performing, by the ground control station, communication with the at least one ground internetworking device includes:

transmitting information for controlling the aerial vehicle to the at lest one ground internetworking device.

12. The method of claim 8, further comprising:

performing communication between the at least one ground internetworking device and the aerial vehicle, after performing, by the ground control station, communication with the at least one ground internetworking device.

13. The method of claim 8, wherein the control area includes:

an area allowing LOS communication with the at least one ground internetworking device.

* * * * *